K. C. RANDALL.
SYSTEM OF ELECTRICAL DISTRIBUTION.
APPLICATION FILED SEPT. 12, 1910.
1,164,015.
Patented Dec. 14, 1915.
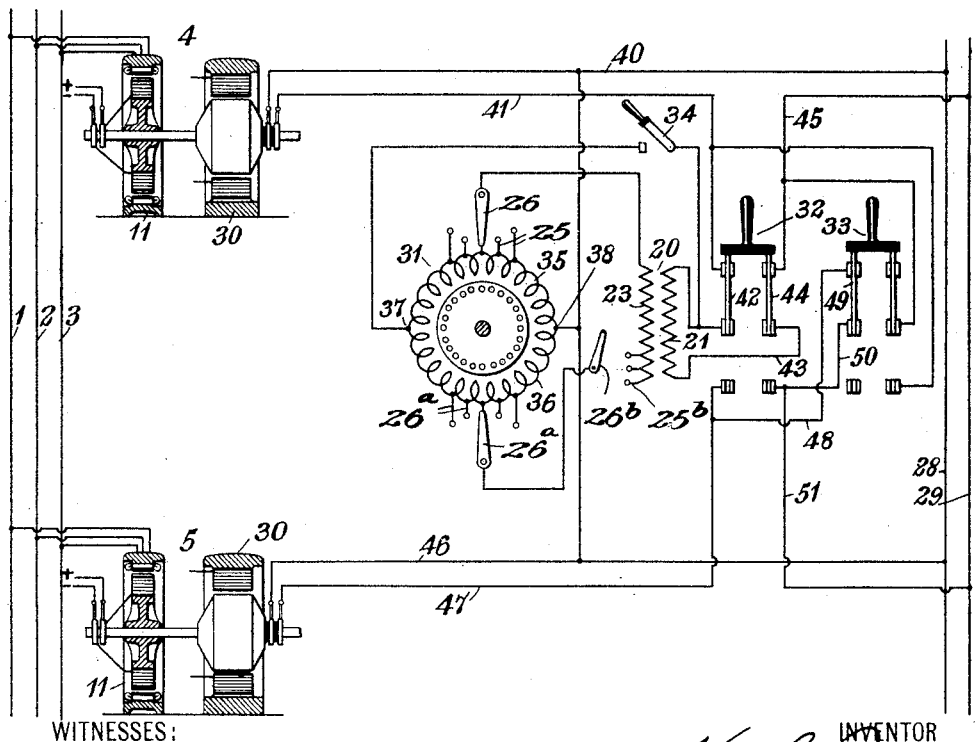
WITNESSES:
INVENTOR
ATTORNEY

UNITED STATES PATENT OFFICE.

KARL C. RANDALL, OF EDGEWOOD PARK, PENNSYLVANIA, ASSIGNOR TO WESTINGHOUSE ELECTRIC AND MANUFACTURING COMPANY, A CORPORATION OF PENNSYLVANIA.

SYSTEM OF ELECTRICAL DISTRIBUTION.

1,164,015.  Specification of Letters Patent.  Patented Dec. 14, 1915.

Application filed September 12, 1910. Serial No. 581,731.

*To all whom it may concern:*

Be it known that I, KARL C. RANDALL, a citizen of the United States, and a resident of Edgewood Park, in the county of Allegheny and State of Pennsylvania, have invented a new and useful Improvement in Systems of Electrical Distribution, of which the following is a specification.

My invention relates to systems of electrical distribution for alternating currents in which a plurality of motor-generator sets, each comprising direct connected synchronous machines, are operated in parallel, and it has for its object to provide simple and effective electrical means for proportioning the load carried by the several sets.

It is well known in the art that the division of load between synchronous generators operating in parallel is determined by the relative phase positions of the machines; the generator which maintains a phase position in advance of the others carrying the greater portion of the load, while the generator which lags behind in phase position is more lightly loaded.

In the usual power station practice, the division of load between a plurality of alternating current generators is secured by adjusting the governing mechanisms of the prime movers, but, in motor-generator sets of the above indicated class, in which alternating current generators are driven by synchronous motors, no such ready means of adjustment has been available. An effective method of obtaining such a division of load has been employed in connection with the above indicated class of motor-generator sets, whereby the load between the several sets is adjusted, by mechanically changing the angular position of the field or armature member of the motor of one set with respect to a similar element of its connected generator. This phase displacement results in driving that particular generator a trifle ahead or behind the other generators with which it is operating in parallel, and causes a similar relative phase displacement of the generated voltages, whereby a new division of load is effected, as will be readily understood. Structural difficulties, however, render this method of adjustment capable of limited commercial application only. According to my invention, I obtain such an adjustment of load between the above class of parallel-operating motor-generator sets through purely electrical means, by causing a relative change in the phase position of the voltage which one or more of the generators supplies to the feeder system, with respect to that supplied by the remaining generators.

The single figure of the accompanying drawing is a diagrammatic view of the circuit connections of a system of electrical distribution which embodies my invention.

The system illustrated in the drawings comprises motor generator sets that are adapted to convert three phase energy into single phase energy, as in many single phase electric railway systems and means to effect a change in the phase position of one of the generated voltages, whereby an adjustment of load may be obtained.

A source of energy 1, 2 and 3 supplies power to a plurality of motor-generator sets 4 and 5 and said sets deliver energy in parallel to a single phase feeder system 28 and 29. The motor generator sets 4 and 5 are of similar construction and each comprises a three phase synchronous motor 11 of the rotatable field magnet type and a single phase alternating current generator 30 of the rotatable armature type.

In order to enable the load between the two motor-generator sets to be adjusted, as desired, an auxiliary single phase induction motor 31, a small auxiliary transformer 20, and suitable switching devices 32, 33 and 34 are provided. By means of said switching devices, the induction motor 31 and the secondary winding 21 of the series transformer 20 may be connected in circuit with either motor-generator set, depending upon the adjustment of load desired. The induction motor 31 is provided with a plurality of sets of taps 25 and 25$^a$ which are symmetrically located near the mid points of primary exciting windings 35 and 36 and are respectively connected to switching devices 26 and 26$^a$. Primary exciting winding 23 of the auxiliary transformer 20 is also provided with a plurality of taps 25$^b$ which are connected to a switching device 26$^b$, by means of which the degree of excitation may be varied.

Under normal operating conditions, the connections of the system are as shown in the drawing, each generating unit 30 supplying energy to the feeder system 28 and 29 through the switching devices 32 and 33.

The induction motor 31 and the auxiliary series transformer 20 are not actively in circuit. In order to increase the load on motor-generator set 4, for example, switch 34 is closed and motor 31 is operated from the voltage generated by said set. The circuit through the exciting winding 23 of the auxiliary series transformer 20 is then completed by means of switching device 26b, and the switching devices 26 and 26a are adjusted until the desired division of load is secured.

It will be understood that, since the exciting winding 23 of series transformer 20 is connected to symmetrically located taps midway between the external motor connections 37 and 38 of the induction motor 31, that an excitation substantially in quadrature with the generated voltage is impressed upon said transformer 20 and, therefore, any desired resultant phase displacement of the normal generated voltage may be obtained by adjusting the switching devices 26, 26a and 26b.

The main circuit connections from the motor-generator set 4 to the feeder system 28 and 29 are as follows: one from generating unit 30, through conductor 40 to line 28, and the other from generating unit 30, through conductor 41, switch member 42, secondary winding 21 of the series transformer 20, conductor 43, switch member 44 and conductor 45 to the line 29. The following are the circuit connections from motor generator set 5 to the feeder system; one from generator 30, through conductor 46 to the line 28, and the other from generating unit 30, through conductor 47, conductor 48, switch member 49, conductor 50 and conductor 51 to the line 29.

In order to increase the load upon motor-generator set 5, switching devices 32 and 33 may be closed in the opposite direction to establish main circuit connections to the feeder system similar to those just described.

With reference to the above-described system to those skilled in the art will readily understand that my invention is not restricted to the use of an auxiliary induction motor, but that other types of dynamo-electric machines may also be employed, as, for instance, a synchronous motor. Likewise, a similar means to that set forth may be used to displace the phase position of the voltage applied to one of the motor-generator sets instead of effecting a change in the phase relations of the generated voltages before impressing them upon the feeder system.

While I have shown and described, for illustrative purposes, a system of electrical distribution which embodies specific arrangements of circuit connections and particular types of apparatus, it is evident that my invention is not limited to the exact circuit arrangements and structural details set forth. Since many modifications may be made without departing from the spirit and scope of my invention, I desire that only such limitations shall be imposed as are indicated in the appended claims.

I claim as my invention:

1. The combination with a source of energy a feeder system and a motor-generator set in circuit with said source and said feeder system and comprising synchronous machines, one of which is a single phase generator, a transformer having a secondary winding connected in series circuit with said set, and a dynamo-electric machine provided with regulable taps connected to the primary winding of the transformer for supplying an excitation thereto.

2. The combination with a source of energy, a motor generator set comprising synchronous machines, and a feeder system supplied thereby, of electrical means embodying a series transformer and an induction motor provided with regulable taps for shifting the phase of the voltage supplied to said system.

3. The combination with a source of energy, a motor generator set comprising synchronous machines, and a feeder system supplied thereby, of electrical means embodying a series transformer and a dynamo-electric machine provided with regulable taps for producing a phase displacement of the voltage supplied by said set to the feeder system.

4. The combination with a source of energy, a motor generator set comprising synchronous units, and a feeder system supplied thereby, of an auxiliary dynamo-electric machine operated from the generator unit, and an auxiliary transformer connected between said set and said system and excited from said dynamo-electric machine.

5. The combination with a source of energy, a motor generator set comprising synchronous machines, one of which is a single phase generator, and a feeder system supplied thereby, of an alternating current dynamo-electric machine operated from said generator, a transformer connected between said generator and said system and excited from said dynamo electric machine, and means for varying the phase and magnitude of its excitation.

6. In a system of alternating current distribution, the combination with a source of energy, a feeder system, and a plurality of motor-generator sets comprising synchronous motors operated in parallel from said source of energy and direct-connected single phase alternating current generators supplying said feeder system, of a single phase alternating current motor adapted to be operated from one of said generators and an auxiliary transformer having a secondary winding connected in series between said generator and the feeder system and a primary winding adapted to be excited from the stator winding of said alternating current motor to produce a phase displacement of the generated voltage supplied to the feeder system.

In testimony whereof, I have hereunto subscribed my name this 8th day of September, 1910.

KARL C. RANDALL.

Witnesses:
O. W. FRIEBORN,
B. B. HINES.